United States Patent
Nikles et al.

[15] 3,656,033
[45] Apr. 11, 1972

[54] ASSEMBLY COMPRISING AN ADJUSTABLE CAPACITOR AND A PRINTED CIRCUIT

[72] Inventors: Francois Nikles, Cornaux; Henri T. Oguey, Peseux, both of Switzerland

[73] Assignee: Centre Electronique Horloger SA, Neuchatel, Switzerland

[22] Filed: Dec. 7, 1970

[21] Appl. No.: 95,634

[30] Foreign Application Priority Data

Dec. 17, 1969 Switzerland .....................18730/69

[52] U.S. Cl. .................317/249 D, 317/101 C, 317/101 CP
[51] Int. Cl. ...........................................................H01g 5/06
[58] Field of Search ..........317/249 R, 249 D, 101 C, 101 CP

[56] References Cited

FOREIGN PATENTS OR APPLICATIONS

807,382  1/1959  Great Britain .....................317/249 D

*Primary Examiner*—E. A. Goldberg
*Attorney*—Stevens, Davis, Miller & Mosher

[57] ABSTRACT

A capacitor, fixed to a printed circuit, comprises a ceramic stator with a continuous metallic layer extending partially over two sides thereof. One side of this layer forms the first plate of the capacitor and the other side is connected to a first part of the printed circuit. A metallic rotor member having a recessed surface is applied by elastic means against a dielectric layer adjacent said one side of the stator. The rotor is mounted on a conducting axle extending through the stator and terminating with a conducting collar protruding from the other side of the stator but not contacting the metallic layer. A connector element, for example either a further conducting layer on the other side of the stator or a spring, connects the collar to a second part of the printed circuit.

7 Claims, 6 Drawing Figures

Patented April 11, 1972

Patented April 11, 1972

ASSEMBLY COMPRISING AN ADJUSTABLE CAPACITOR AND A PRINTED CIRCUIT

BACKGROUND OF THE INVENTION

The present invention concerns an assembly of the type comprising an adjustable capacitor and a printed circuit, in which the capacitor comprises a ceramic stator carrying a first plate and having a dielectric layer adjacent the first plate, a rotor formed of a metallic member having a recessed surface adjacent the dielectric layer, said rotor forming a second plate and being rotatably mounted on a conducting axle, and elastic means for axially urging the rotor against the stator.

SUMMARY OF THE INVENTION

An object of the present invention is to provide an assembly of the above mentioned type the thickness of which can be greatly reduced. Accordingly, the invention provides an improvement in an assembly of the above-mentioned type comprising a continuous metallic layer extending at least partially over two parallel surfaces of the ceramic stator, said metallic layer on a first surface of the stator forming said first plate, said metallic layer on a second surface of the stator contacting a first conducting part of the printed circuit. The conducting axle of the rotor is fixed to a conducting collar protruding from the second surface of the stator but not contacting said metallic layer, and a connector element is arranged to bear against said collar and against a second conducting part of the printed circuit.

This assembly can be used in various electronic circuits, and is specially suitable when the dimensions of the assembly must be very small. It also enables reduction of the number of connections because the printed circuit is used as a contact.

DESIGNATION OF THE DRAWINGS

The accompanying drawings show, by way of example, two embodiments of an assembly according to the invention, and variants thereof. In the drawings:

FIG. 1 is a cross-section of a first embodiment;
FIG. 2 is a cross-section of a second embodiment;
FIGS. 3 and 4 are respectively an underneath plan view of a rotor, and a cross-section of the rotor; and
FIGS. 5 and 6 are underneath plan views of two variants of a rotor.

DESCRIPTION OF PREFERRED EMBODIMENTS

Figure 1:
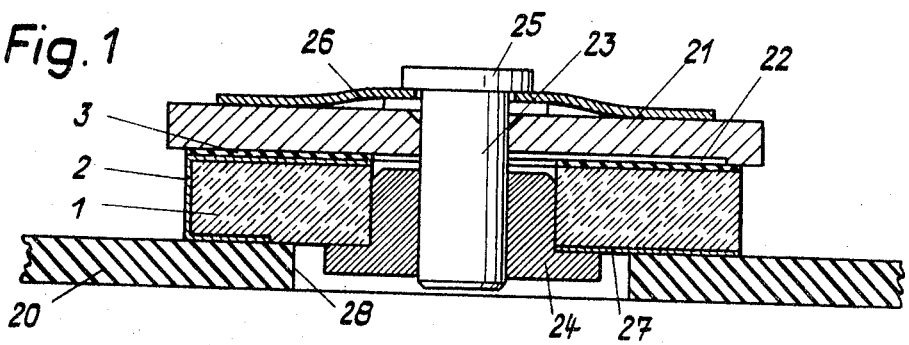

The capacitor of the assembly shown in FIG. 1 comprises a ceramic material stator in the form of a disc 1 provided with a layer 2 formed by the metallisation of a part of the surfaces of the ceramics disc 1. This layer extends over parts of the two faces of the disc connected by a metallised coating over a part of the edge of the disc 1. The part of the layer 2 on the upper surface of the disc 1 forms a first plate of the capacitor. The part of the layer 2 on the lower surface of the disc 1 terminates some distance away from a central bore in the disc. All of the upper surface of the stator disc 1 is covered by a dielectric layer 3, which is thin, of a high dielectric coefficient, and is accurately planar so as to obtain a high capacitance.

The rotor is formed by a metallic plate 21 which also has an accurately planar lower surface, but having a hollow section 22, forming a second plate of the capacitor. This surface rests on the upper surface of the dielectric layer 3 of the stator. The rotor plate 21 is, in this example, of polygonal shape so that it can be turned by means of a suitable tool.

The rotor plate 21 is rotatably mounted about a metallic axle 23 tightly fitted in a metallic collar-piece 224, the collar of which bears against the lower surface of the ceramic disc 1. The upper end of the rotor axle 23 has a head 25 projecting above the rotor plate 21. A leaf spring acts, on the one hand, under this head 25 and, on the other hand, against the upper surface of the rotor plate 21. The axle 23 being tightly fitted in the collar piece 24, the pressure of the leaf spring 26 urges the rotor plate 21 against the dielectric layer 3 of the stator. Additionally, the collar of the piece 24 is pressed against the lower surface of the ceramic disc 1. This lower surface has a second metallised layer 27 insulated from the layer 2 and in contact with the collar of the metallic piece 24. The part of the metallised layer 2 situated on the lower surface of the ceramics disc 1 and the metallised layer 27, which are the terminals of the capacitor, are soldered onto parts of a printed circuit applied on a surface of a support plate 20.

The part of the collar piece 24 extending beyond the lower surface of the stator is housed in an opening 28 of the support plate 20 for the printed circuit, and within the thickness of this plate.

Figure 2:
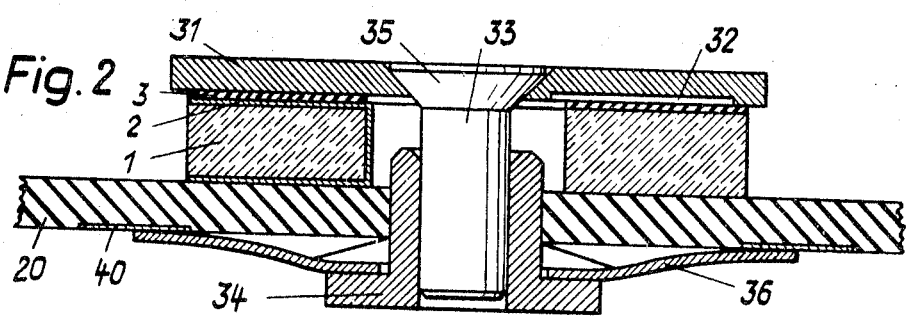

The capacitor of the assembly shown in FIG. 2 is mounted on a printed circuit which is printed on both sides of a support plate 20. The capacitor comprises, as in the example of FIG. 1, a ceramic disc 1 covered with a metallised layer 2 extending partially over the two surfaces of the disc but connected by a metallisation on the interior of a central bore in the disc 1. The stator is fixed on the support plate 20 for the printed circuit and is covered on its upper surface by a dielectric layer 3.

The rotor is formed by a metallic plate 31 provided with a hollow section 32 in its surface contacting the dielectric layer 3.

The rotor axle 33 has a truncoconical head 35 countersunk in the rotor plate 31. The axle 33 is tightly fitted in a metallic tube with a collar 34 mounted without play in the plate 20 of the printed circuit. A leaf spring 36 bears, on the one hand, against the collar 34 which is located under the plate 20 and, on the other hand, against the lower surface of the plate 20 thus setting up a connection between lower metallised parts 40 of the printed circuit. The pressure exerted by the leaf spring 36 between the collar 34 and the plate 20 is transmitted to the rotor plate 31 through the head 35 of the rotor axle 33. In this embodiment, the connection of the capacitor is provided on the two sides of the printed circuit plate 20. The part of the layer 2 of the stator adjacent the printed circuit 20 is preferably soldered thereto, so as to avoid any accidental rotation thereof during adjustment of the capacitor by rotation of the rotor 31.

In the two described constructions, the rotor is formed directly by a metallic plate mounted on a metallic axle which thus sets up a connection between this second plate of the capacitor and the printed circuit.

The shape of the hollow section of the rotor, as well as that of the metallic layer on the stator, enable a variation of capacitance according to a desired mathematical relationship, whilst conserving a correct seating of the rotor on the stator. The shapes of the hollows can thus be numerous.

Figure 3:
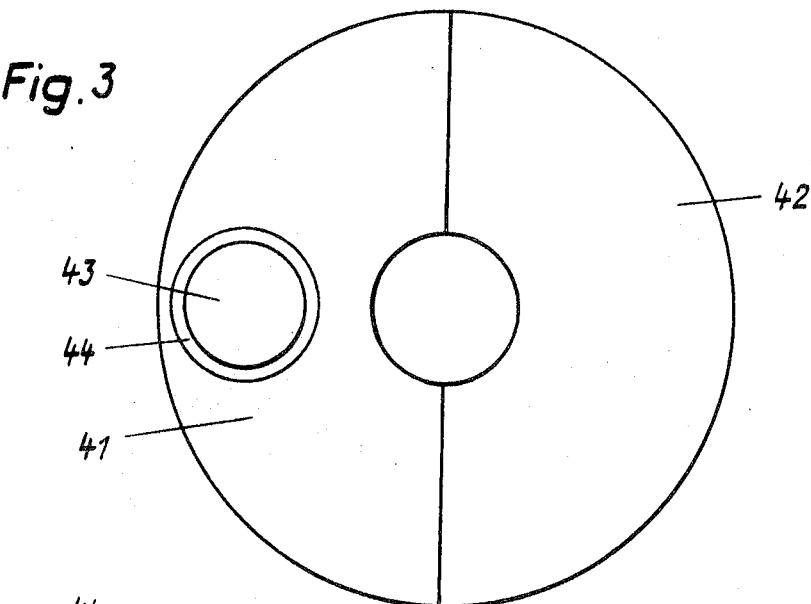
Figure 4:
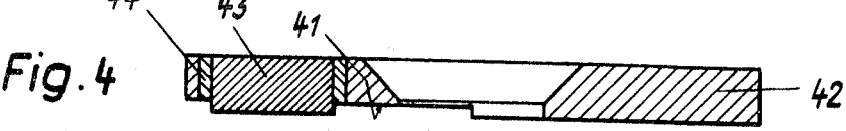

In FIGS. 3 and 4 there is shown a rotor in the form of a disc 42, the hollow section 41 extending over a half of the surface of this disc. The seating of the rotor is provided by a metallic pin 43 fixed in the half of the disc including the hollow section 41 and protruding by an amount equal to the depth of the hollow. An insulating ring 44 separates the pin 43 from the metallic disc 42.

It would also be possible to replace this pin by a layer of plastic material filling the hollow section 41.

Figure 5:
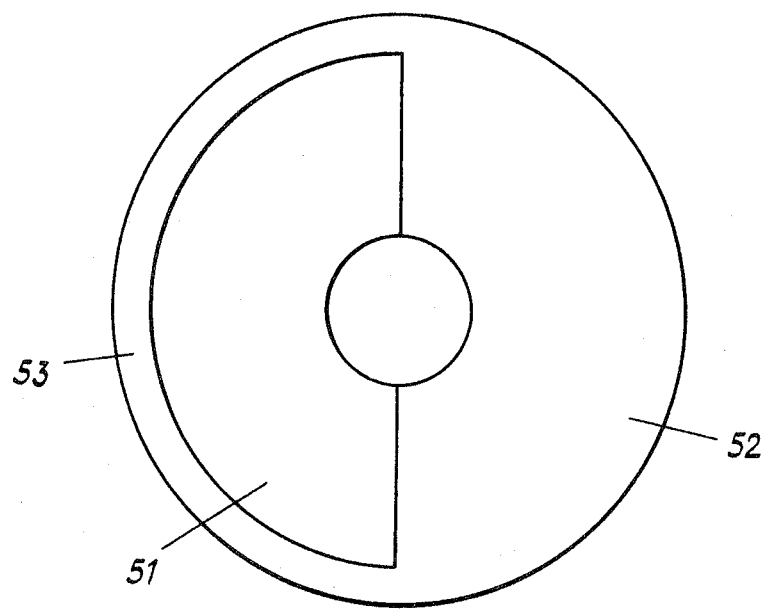

In the variant of the rotor shown in FIG. 5, the hollow section 51 extends over a semi-circular segment the outer radius of which is less than the outer radius of the disc 52 in a manner to provide a supporting crown-like segment 53 around the semi-circular hollow segment 51. In this variant, the value of the capacitance is a linear function of the angle of the rotor in relation to the metallic layer on the adjacent surface of the stator.

Figure 6:
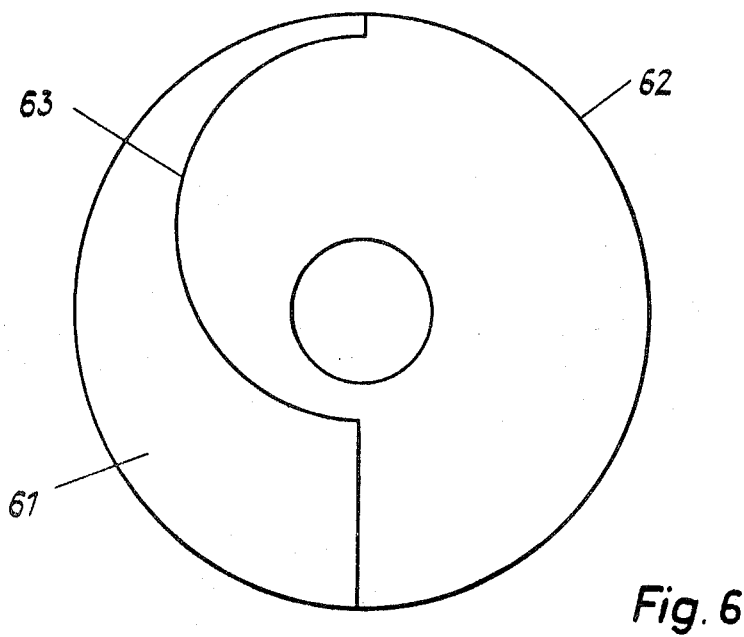

In the variant shown in FIG. 6, the rotor disc 62 has a recessed section 61 extending to its periphery. This recessed section 61 is defined by an arc 63 of a circle eccentric to the axle of the disc 62. This shape of recessed section 61 ensures a good seating of the rotor disc 62 and, additionally, gives a relatively large minimum capacitance $C_{min}$ and a linear variation of the capacitance as a function of the angular position of the rotor The mathematical relationship giving the variation of the curve as a function of the angular position of the rotor can be chosen in a manner to linearize a value depending upon the capacitance but which is not proportional thereto. The frequency of oscillation of a quartz crystal connected in series with the capacitor can be quoted as an example.

When the rotor is disc like, as shown in FIGS. 3 to 6, means (not shown) could be provided in the thickness of the disc to enable it to be turned by means of a suitable tool.

What is claimed is:

1. In an assembly comprising an adjustable capacitor fixed to a printed circuit, the capacitor comprising a ceramic stator carrying a first plate and having a dielectric layer adjacent the first plate, a rotor formed of a metallic member having a recessed surface adjacent the dielectric layer, said rotor forming a second plate and being rotatably mounted on a conducting axle, and elastic means for axially urging the rotor against the stator, the improvement comprising a continuous metallic layer extending at least partially over two parallel surfaces of the ceramic stator, said metallic layer on a first surface of the stator forming said first plate, said metallic layer on a second surface of the stator contacting a first conducting part of the printed circuit, the conducting axle of the rotor being fixed to a conducting collar protruding from the second surface of the stator but not contacting said metallic layer, and a connector element arranged to bear against said collar and against a second conducting part of the printed circuit.

2. Assembly according to claim 1, in which the conducting collar is formed by a metallic collar-piece tightly fitted on said conducting axle, said connector element being formed by a conducting layer on the second surface of the stator insulated from said metallic layer.

3. Assembly according to claim 1, wherein the printed circuit is printed on opposed first and second sides of a support plate, said metallic layer on the second surface of the stator contacting a first part of the printed circuit on the first surface of the support plate, and wherein a spring simultaneously forms said elastic means and said connector element, the conducting collar being formed by a metallic collar-piece tightly fitted on said conducting axle, and the spring connecting a second part of the printed circuit on the second surface of the support plate with the collar-piece.

4. Assembly according to claim 3, in which an end of said conducting axle is countersunk in the metallic member forming the rotor.

5. Assembly according to claim 1, in which a metallic pin is insulatingly fixed in an opening in said metallic rotor member at a recessed part of said surface, said pin protruding beyond the recessed part of said surface by an amount equal to the height of the recess.

6. Assembly according to claim 1, in which the recessed part of the surface of said rotor is filled with an electrically insulating material.

7. Assembly according to claim 1, in which the rotor comprises means to enable rotation thereof about said axle.

* * * * *